United States Patent [19]
Inoue et al.

[11] Patent Number: 5,398,189
[45] Date of Patent: Mar. 14, 1995

[54] NAVIGATION SYSTEM FOR MOTOR VEHICLES

[75] Inventors: Nobutaka Inoue, Aichi; Shigemitsu Toriyama, Yokkaichi, both of Japan

[73] Assignee: Masprodenkoh Kabushikikaisha, Japan

[21] Appl. No.: 153,412

[22] Filed: Nov. 15, 1993

[30] Foreign Application Priority Data

Nov. 16, 1992 [JP] Japan .................................. 4-305398
Dec. 28, 1992 [JP] Japan .................................. 4-348658

[51] Int. Cl.⁶ .............................................. G06F 15/50
[52] U.S. Cl. ..................................... 364/449; 364/444; 340/990; 340/995
[58] Field of Search ....................... 364/443, 444, 449; 73/178 R; 340/988, 990, 995

[56] References Cited

U.S. PATENT DOCUMENTS

| | | | |
|---|---|---|---|
| 4,403,291 | 9/1983 | Von Tomkewitsch | 364/444 |
| 4,550,317 | 10/1985 | Moriyama et al. | 364/449 |
| 4,689,747 | 8/1987 | Kurose et al. | 364/449 |
| 4,796,189 | 1/1989 | Nakayama et al. | 364/449 |
| 4,879,658 | 11/1989 | Takashima et al. | 364/449 |
| 4,882,689 | 11/1989 | Aoki | 364/449 |
| 4,926,336 | 5/1990 | Yamada | 364/444 |
| 4,943,925 | 7/1990 | Moroto et al. | 340/988 |
| 5,067,082 | 11/1991 | Nimura et al. | 340/995 |
| 5,121,326 | 6/1992 | Moroto et al. | 364/449 |
| 5,168,452 | 12/1992 | Yamada et al. | 364/444 |
| 5,184,123 | 2/1993 | Bremer et al. | 364/449 |
| 5,220,507 | 6/1993 | Kirson | 364/444 |
| 5,231,584 | 7/1993 | Nimura et al. | 364/444 |
| 5,272,638 | 12/1993 | Martin et al. | 364/444 |
| 5,274,387 | 12/1993 | Kakihara et al. | 364/449 |

FOREIGN PATENT DOCUMENTS

| | | |
|---|---|---|
| 0158214 | 10/1985 | European Pat. Off. . |
| 0323230 | 5/1989 | European Pat. Off. . |
| 0323246 | 7/1989 | European Pat. Off. . |
| 0348528 | 1/1990 | European Pat. Off. . |
| 0485120 | 5/1992 | European Pat. Off. . |
| 1130299 | 11/1987 | Japan . |
| 1136300 | 11/1987 | Japan . |
| 63-188517 | 5/1989 | Japan . |
| 2079453 | 1/1982 | United Kingdom . |
| 2111204 | 6/1983 | United Kingdom . |
| 2238870 | 11/1989 | United Kingdom . |
| 92/08952 | 5/1992 | WIPO . |
| 93/09510 | 5/1993 | WIPO . |

Primary Examiner—Gary Chin
Attorney, Agent, or Firm—Davis, Bujold & Streck

[57] ABSTRACT

A navigation system for motor vehicles determines a plurality of zones for determining the approach of the vehicle to a route intersection. The zones are pie-shaped sectors of circles having the next intersection at its center and having radii that vary with respect to the vehicle velocity. The zones lie along an approach course the vehicle takes in approaching the next intersection. When the vehicle enters any one of the zones thus determined, one of the zones is selected according to the current velocity of the vehicle such that the higher the vehicle velocity is, the larger the radius of the circle corresponding to the selected zone is. The driver is then informed that the vehicle is approaching the intersection and is informed of the direction to take at the intersection.

15 Claims, 11 Drawing Sheets

| INTERSECTION ADDRESS | C1 | C2 | | C 20 | |
|---|---|---|---|---|---|
| LONGITUDE (x-COORDINATES) | x 1 | x 2 | | x 20 | |
| LATITUDE (y-COORDINATES) | y 1 | y 2 | | y 20 | |
| ADDRESS OF NEXT INTERSECTION | C2 C7 C11 C1 | C3 C5 | | C 3 C21 C25 | |
| NODE LIST | N1 N2 | | | | |
| REGISTERED INTERSECTION | P1 | P2 | | P4 | |

| ITEM | INSTRUCTIONS |
|------|--------------|
| 100 | DETECT VEHICLE POSITION, VELOCITY AND ADVANCING DIRECTION |
| 110 | POSITION INDICATION PROCESS |
| 120 | RETRIEVE NEXT REGISTERED INTERSECTION |
| 130 | WITHIN PREDETERMINED RANGE? |
| 140 | i ← n |
| 150 | DETERMINE THREE GUIDANCE ZONES FOR REGISTERED INTERSECTION Pi |
| 160 | DETERMINE THREE DEVIATION DETERMINATION CIRCLES WITH REGISTERED INTERSECTION Pi AT ITS CENTER |
| 170 | DETERMINED DEVIATION DETERMINATION BEARINGS |
| 180 | DETECT POSITION, VELOCITY, AND ADVANCING DIRECTION |
| 190 | POSITION INDICATION PROCESS |
| 200 | SINGLE GUIDANCE ZONE SELECTED? |
| 210 | ENTERED ANY GUIDANCE ZONE? |
| 220 | SELECT A ZONE ACCORDING TO VELOCITY |
| 230 | SELECT A DEVIATION DETERMINATION CIRCLE ACCORDING TO VELOCITY |
| 240 | IN SELECTED ZONE? |
| 250 | INTERSECTION GUIDANCE PROCESS |
| 260 | DEVIATION DETERMINATION PROCESS |
| 270 | i=0? |
| 280 | i RENEWED? |

| ITEM | INSTRUCTIONS |
|---|---|
| 250 | INTERSECTION GUIDANCE PROCESS |
| 300 | RETRIEVE GUIDANCE PATTERN FOR EACH ZONE |
| 310 | IMMEDIATELY AFTER ENTRANCE TO SELECTED ZONE? |
| 320 | FLASH REGISTERED INTERSECTION Pi |
| 330 | CALCULATE DIRECTION TO TAKE AT REGISTERED INTERSECTION Pi |
| 340 | PERFORM FIRST ADVANCING DIRECTION GUIDANCE |
| 350 | ENTERED PASSAGE DETERMINATION ZONE? |
| 360 | IMMEDIATELY AFTER ENTRANCE TO SECOND ZONE? |
| 370 | PERFORM SECOND ADVANCING DIRECTION GUIDANCE |
| 380 | ANNOUNCE PASSAGE |
| 390 | TERMINATE FLASHING OF REGISTERED INTERSECTION Pi |
| 400 | i ← i + 1 |

| ITEM | INSTRUCTIONS |
|---|---|
| 260 | DEVIATION DETERMINATION PROCESS |
| 500 | TERMINATE FLASHING OF REGISTERED INTERSECTION Pi |
| 510 | TRAVELED OUT OF SELECTED ZONE? |
| 520 | IN DEVIATION DETERMINATION BEARINGS |
| 530 | i ← i + 1 |
| 540 | ANNOUNCE DEVIATION |
| 550 | i ← 0 |

FIG. 8

NAVIGATION SYSTEM FOR MOTOR VEHICLES

BACKGROUND OF THE INVENTION

This invention relates to a navigation system for motor vehicles for guiding a driver when the vehicle approaches an intersection on a predetermined route to be taken. More articularly, this invention relates to such a navigation system where guidance is provided according to the current velocity of the vehicle and misleading guidance due to erroneous detection of vehicle position is prevented.

A conventional navigation system for vehicles is provided with a screen such as cathode ray tube CRT, a liquid crystal display, or other display means for displaying thereon a road map. The route and current position of the vehicle are indicated on the displayed road map. When a vehicle approaches an intersection on a predetermined route, the driver is informed by an indication on the screen or by an audible message.

Such a navigation system continually detects the current position of the vehicle and obtains the distance between the current vehicle position and the next intersection on a predetermined route. When the distance becomes a given value or less, the system informs the driver that the vehicle is approaching the next intersection. Therefore, if the current position as detected is incorrect due to a detection error, the system may wrongly inform the driver that the vehicle is approaching the intersection when the vehicle actually is not approaching the intersection.

In this case, since the driver associates the announced information with the route indicated on the displayed road map, the direction he perceives the vehicle is heading for may be incorrect. Resultantly, the driver may turn right at the intersection where he should actually go straight, or go straight at the intersection where he should turn right, etc.

There is known another type of navigation system by which a driver is informed by an audible message of the direction to take at the intersection the vehicle is approaching. In this type of system, the driver takes, at the intersection, the direction as informed without paying attention to the route indicated on the road map. As a result, even if the vehicle is deviating from a predetermined route, the driver can recognize the deviation only long after it takes place, resulting in a large deviation from the predetermined route.

Further, in these prior art navigation systems, the value of the distance between the current vehicle position and a target intersection that triggers guidance of the driver at an intersection is preset at a constant value and is not varied according to the velocity of the vehicle. Therefore, regardless of the vehicle velocity, the time period that the driver has in preparation for the target intersection is constant, and the driver tends to feel uneasy because the time period is too long when driving at a low speed or too short when driving at a high speed.

SUMMARY OF THE INVENTION

Wherefore, an object of the present invention is to provide a navigation system for motor vehicles for guiding a driver when the vehicle approaches an intersection wherein misleading intersection guidance due to erroneous detection of vehicle position is prevented and guidance is provided for an appropriate time period corresponding to the vehicle velocity.

Figure 1:
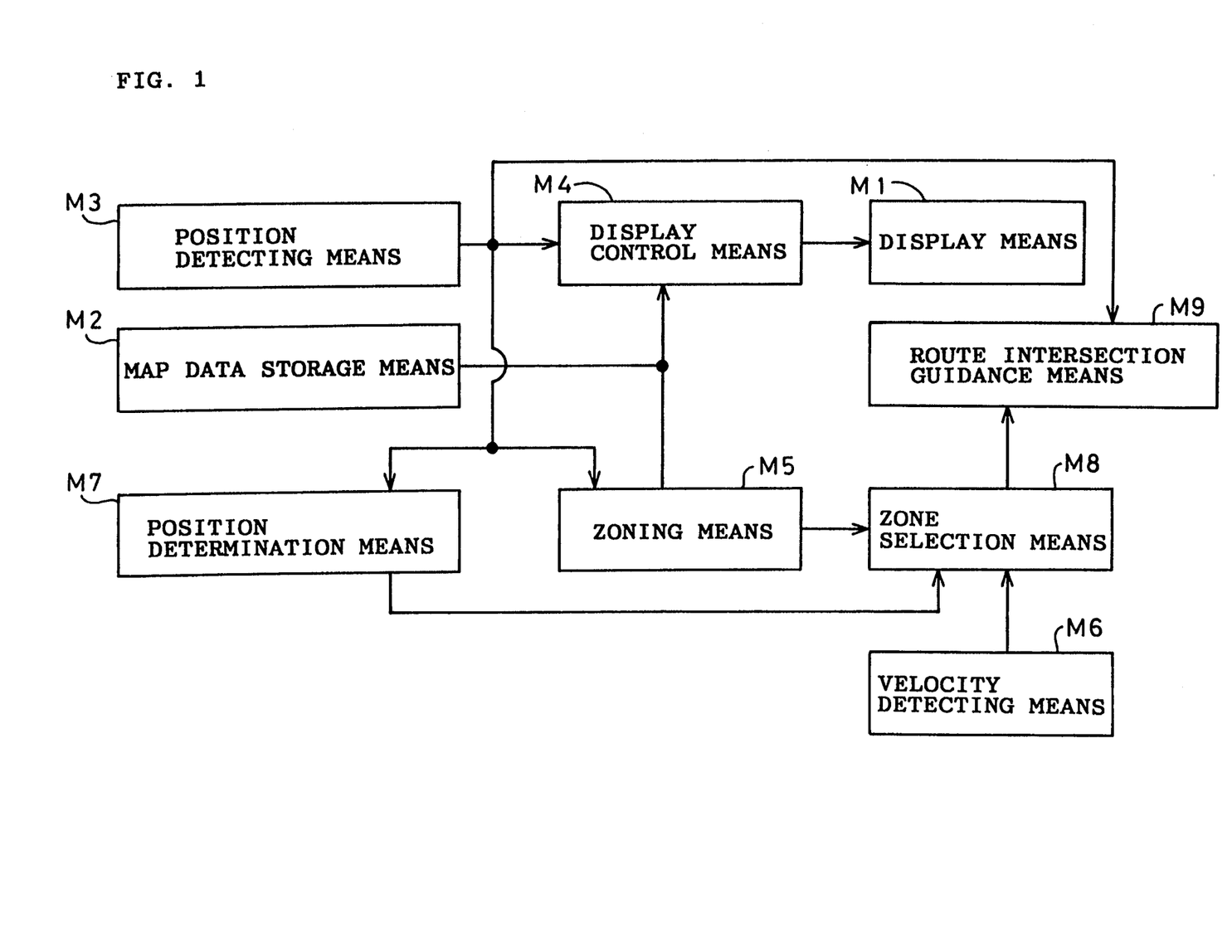
FIG. 1 is a block diagram schematically showing the structure of a navigation system for a vehicle according to the invention.

In order to attain the stated objective, the present navigation system includes display means M1 for displaying a road map, map data storage means M2 for storing map data to provide the road map and a predetermined route to be taken on the road map, position detecting means M3 for detecting the current position of the vehicle, and display control means M4 for controlling the display means M1 to display a road map according to the map data and for recognizably indicating the predetermined route and the current position of the vehicle on the displayed road map.

The present navigation system for vehicles also includes a zoning means M5 for determining, according to the predetermined route and the current position of the vehicle, a next intersection on the route, and for determining, according to an approach course the vehicle takes on the predetermined route toward the next intersection, a plurality of pie-shaped guidance zones defined by sectors of circles having the next intersection at their center and varied predetermined approach determination distances to the next intersection as their radii. The guidance zones have chords of equal length of and predetermined varied angles between their two radii with the approach course dividing the angles in half.

The present navigation system also includes a velocity detecting means M6 for detecting the velocity of vehicle, and a position determination means M7 for determining, according to the vehicle position detected, whether the vehicle has entered a predetermined range of distance from the next intersection.

The present navigation system for motor vehicles further includes a zone selection means M8 for selecting, when it is determined by the position determination means M7 that the vehicle has entered the predetermined range of distance from the next intersection, a guidance zone according to the vehicle velocity detected by the velocity detecting means M6. The guidance zone is selected such that the higher the vehicle velocity is, the larger the approach determination distance of the selected guidance zone is.

The present navigation system for vehicles further includes a route intersection guidance means M9 for determining whether the current detected vehicle position is within the selected guidance zone, and for announcing, when it is determined that the vehicle position is within the selected guidance zone, that the vehicle is approaching the route intersection.

In operation, the display control means M4 causes the display means M1 to display a road map according to the map data stored in the map data storage means M2. A predetermined route, also stored in the map data storage means M2, and the current vehicle position detected by the position detecting means M3 are recognizably indicated on the displayed road map.

The zoning means M5 then determines a next intersection to be passed by the vehicle based on the predetermined route and the vehicle position detected by the position detecting means M3. The zoning means M5 further determines a plurality of guidance zones according to an approach course the vehicle takes in approaching the next intersection. Each of the guidance zones is defined by a pie-shaped sector of a circle having at the next intersection on the route at its center and a given respective value called the approach determination distance as its radius. The pie-shaped guidance zones have chords of equal length and the angle between two radii is divided in half by the approach course of the vehicle.

Subsequently, the velocity detecting means M6 detects the velocity of the vehicle, and the position determination means M7 refers to the vehicle position detected by the position detecting means M3 and determines whether the vehicle has entered a predetermined range of distance from the next intersection. When the position determination means M7 determines that the vehicle has entered the predetermined range of distance from the next intersection, the zone selection means M8 selects a guidance zone according to the vehicle velocity detected by the velocity detecting means M6 such that the higher the vehicle velocity is, the larger the approach determination distance of the selected guidance zone.

Consequently, the route intersection guidance means M9 determines whether the vehicle position is within the selected guidance zone. When the vehicle position is within the selected guidance zone, the system informs the driver that the vehicle is approaching the next intersection on the route.

A prior art navigation system determines a guidance zone defined by a circular area with the next intersection at its center and a predetermined approach determination distance to the center as its radius.

In contrast, the present navigation system does not use the area covered by the circle in the prior art system as a zone to provide intersection guidance. Instead, the present system utilizes a pie-shaped guidance zone. The pie-shaped zone has two radii of a circle which places at its center the next intersection. A predetermined angle between the radii is divided in half by the approach course the vehicle takes in approaching the next intersection. A plurality of guidance zones are provided and their length of their radii vary with respect to the velocity of the vehicle, while the length of their chords remain equal. When the vehicle enters into a given range of distance from the next intersection, one of the guidance zone thus determined is selected according to the vehicle velocity at the time when the vehicle enters into the predetermined range. The selection is made such that the guidance zone having a larger approach determination distance is selected for a higher vehicle velocity. While the vehicle is traveling through the selected guidance zone, the driver is provided with the information that the vehicle is approaching the next intersection.

BRIEF DESCRIPTION OF THE DRAWINGS

The invention will now be described, by way of example, with reference to the drawings in which.

DETAILED DESCRIPTION OF THE PREFERRED EMBODIMENT

The embodiments of the present invention are explained hereunder referring to the drawings although it is understood that the other embodiments are within the scope of the present invention.

Figure 2:
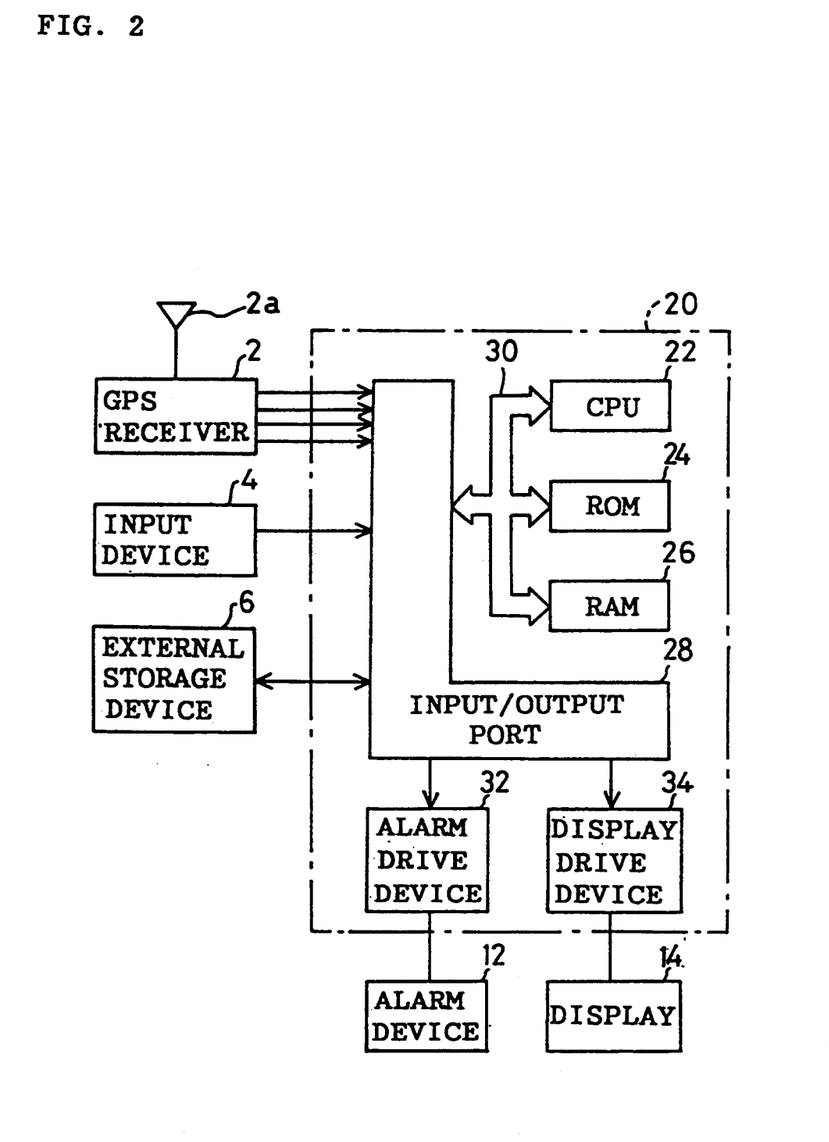
FIG. 2 is a block diagram schematically showing the navigation system of the preferred embodiment.

As shown in FIG. 2, the present navigation system includes an antenna $2a$ and a known receiver 2 for receiving signals transmitted from an artificial satellite as part of Global Positioning System GPS. Diffusion conversion is performed on the received signals to obtain longitude data, latitude data, and altitude data together indicative of the location where the signals are received, i.e. the current position of the vehicle, the velocity data indicative of the traveling speed of the received location, i.e. the driving speed, and the advancing direction of the vehicle. The receiver 2 thus corresponds to the position detecting means M3 and velocity detecting means M6.

The navigation system also includes an input device 4. The input device 4 is provided with a plurality of keys for inputting the route and for switching the operation mode between the route input mode, the navigation mode, and other modes.

The navigation system further includes an external storage device 6, an alarm device 12, a display 14, and a main controller 20. The external storage device 6 stores previously prepared map data and corresponds to map data storage means M2. The alarm device 12 provides a variety of alarms via audible messages to the driver. The display 14 may include a cathode ray tube CRT, a liquid crystal screen, and other display means and displays a road map and other information. The main controller 20 retrieves data from the receiver 2, input device 4, external storage device 6 and other parts of the system, and controls the alarm 12 and display 14 based on the data retrieved.

Figure 3:
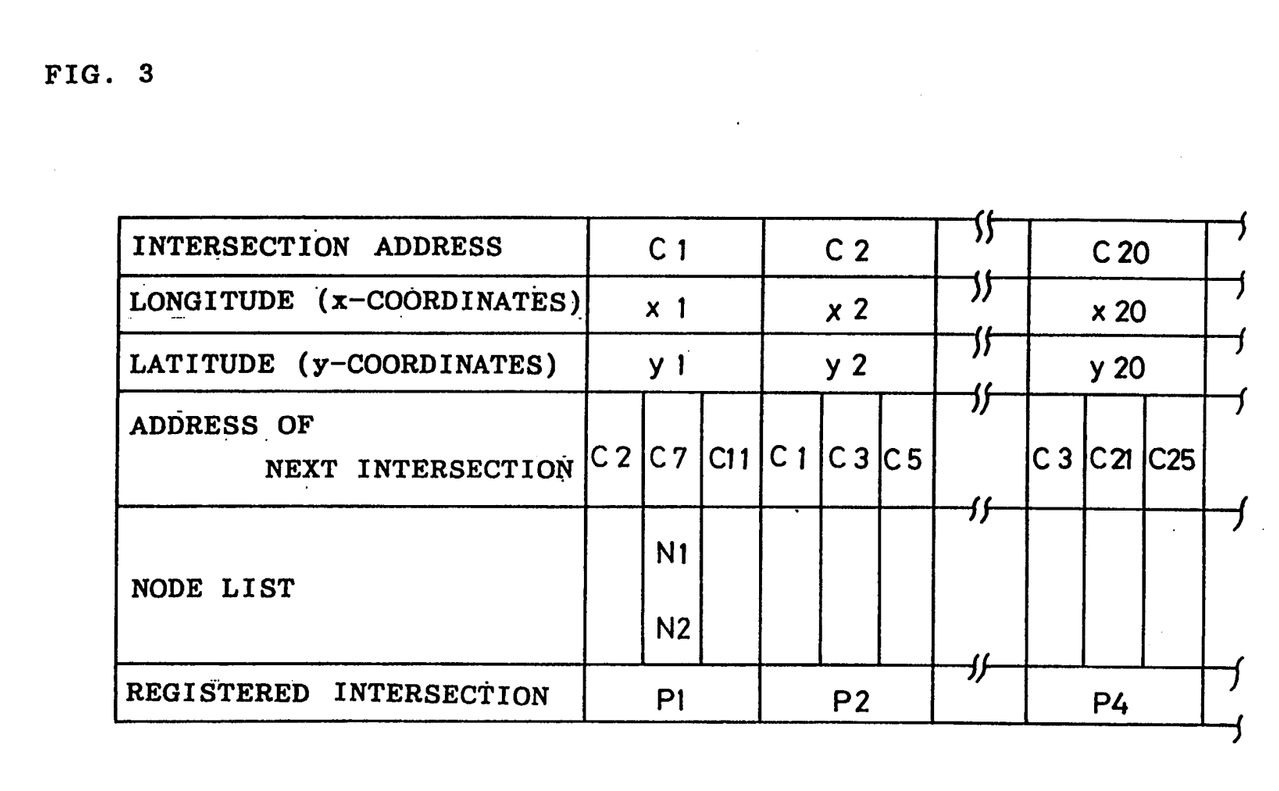
FIG. 3 is a table displaying intersection data stored in the external storage device.

The external storage device 6 stores, in addition to map data to provide a road map to be displayed, intersection data for use in determining and indicating a route to be taken. As shown in FIG. 3, the intersection data includes intersection addresses Ci (i:integer value from 1 to m) for each intersection included in the road map. The intersection data also includes longitude (x-coordinate) and latitude (y-coordinate) data together indicative of the location of each intersection. The intersection data further includes intersection address Ci of the next intersection, a node list indicative of inflection points Ni between an intersection of interest and a next intersection. During the route input mode, the intersections on a predetermined route are consecutively registered and stored as registered intersections Pi.

The main controller 20 is a known microcomputer including a CPU 22, a ROM 24, a RAM 26, an input/output port 28, and a bus line 30 connecting these components. The main controller 20 is provided with an alarm drive device 32 and a display drive device 34 via which the main controller 20 activates the alarm device 12 and the display 14, respectively.

During the route input mode, each intersection is designated as a route intersection by being input through the input device 4 and is stored by the main controller 20 as a registered intersection Pi. The main controller 20 thus performs the route input process and stores a route to be taken in the external storage device 6.

Figure 4:
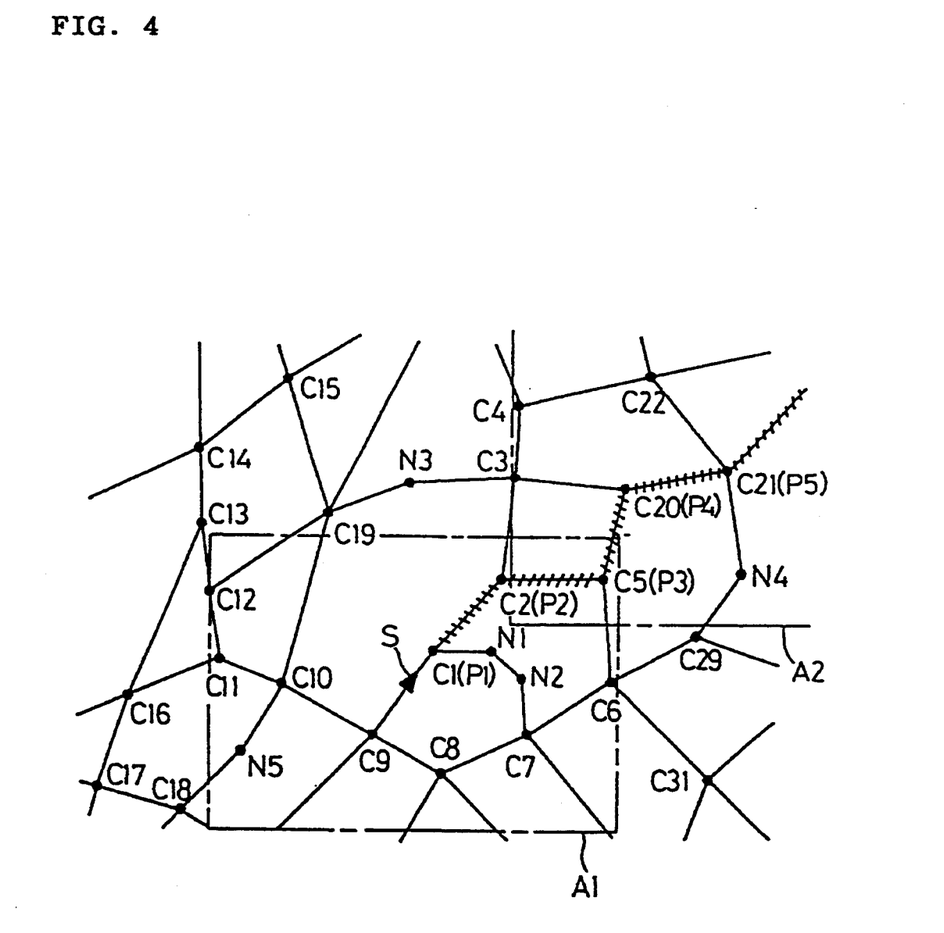
FIG. 4 is an illustration showing how a road map is displayed on the display.

When the navigation system is set in the navigation mode, the map data is retrieved from the external storage device 6 with the current vehicle position at its center. According to the map data retrieved, a road map of the corresponding area, shown exemplarily in FIG. 4 as area A1, is displayed on the display 14. The current vehicle position S and the route, represented by a line crossed with slashes in the figure, are indicated on the road map. The main controller 20 thus serves as display control means, and then effects the navigation process shown in FIGS. 5A through 7.

When the GPS receiver 2 detects both the current position and the advancing direction of the vehicle, a red triangle is marked on the displayed road map at a location and direction corresponding to the determined current position and direction. If the GPS receiver 2 cannot specify an advancing direction of the vehicle, a black dot is marked on the road map at the vehicle's current location. The route is indicated by accentuating the corresponding roads and intersections with different colors.

Figure 5A:
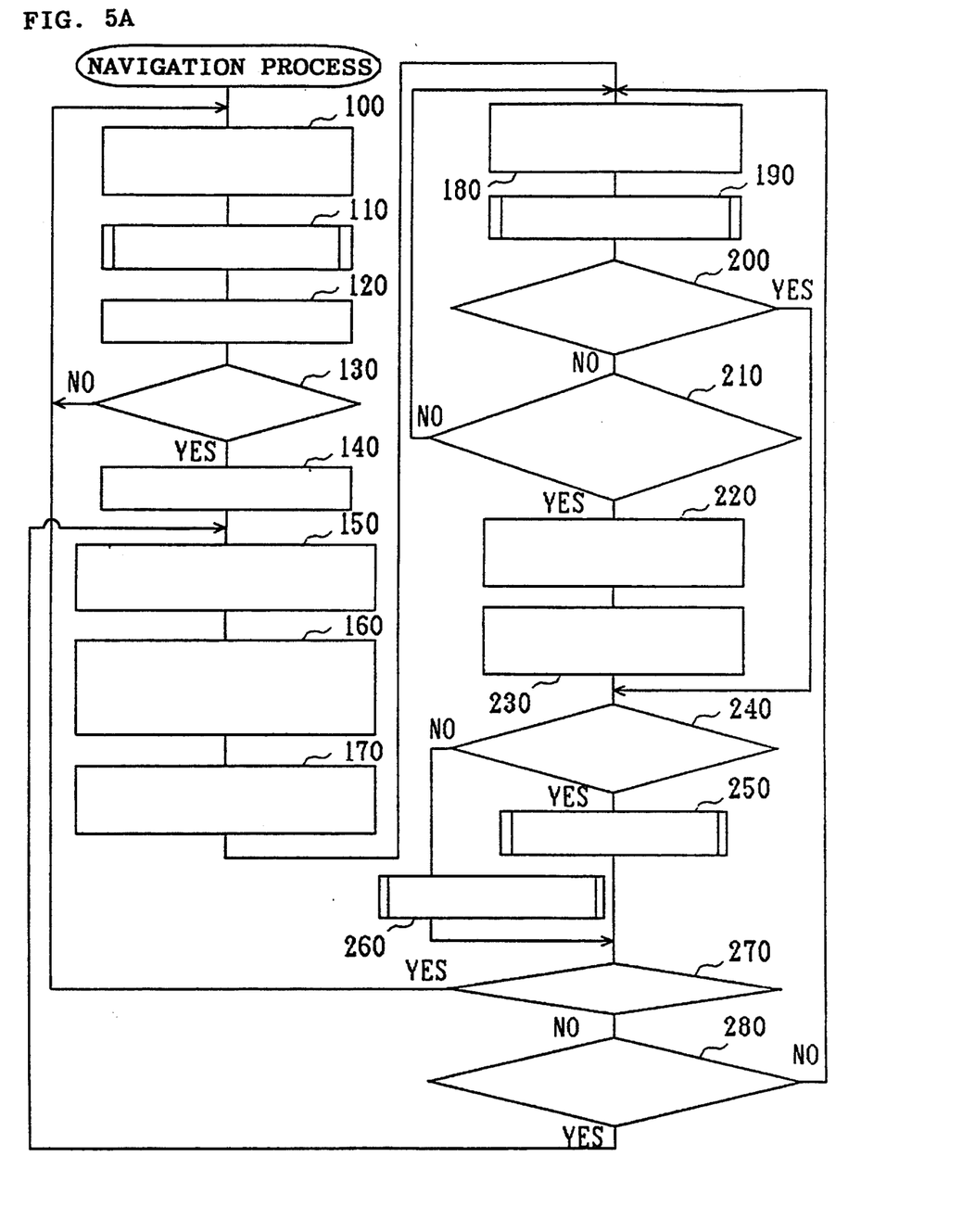
FIGS. 5A and 5B together are a flowchart showing the navigation process performed by the controller.

As shown in FIG. 5A the navigation process starts at step S100 where the current position, the velocity, and the advancing direction of the vehicle are detected using the GPS receiver 2. At the next step S110, the position indication process is performed to renew the position and advancing direction of the vehicle currently indicated on the road map displayed on the display 14.

As a result of the position indication process, the vehicle position detected most recently is indicated on the display 14. Further, if the new vehicle position is out of a given area on the screen, the area of road map currently displayed is changed, for instance from area A1 to A2 in FIG. 4, such that the new vehicle position is symmetrically located relative to the former one with respect to the center of the screen.

At step S120, the next intersection Pn closest to the current vehicle position is retrieved from all the registered intersections Pi stored within the external storage device 6.

At step S130, it is determined whether the retrieved intersections Pn is within a given range of distance from the current vehicle position.

The given range of distance referred to is selectively provided with respect to the velocity of the vehicle at the time of determination. Specifically, a circle is provided having a radius substantially of 300 m (984 Ft) for when the vehicle velocity is 40 km/h (24.85 mph) or less, of 430 m (1410.4 Ft) for the vehicle velocity over 40 km/h (24.85 mph) to 90 km/h (55.9 mph), and of 600 m (1968 Ft) for the velocity over 90 km/h (55.9 mph).

When it is determined at step S130 that the next intersection Pn is not within the above described range of distance, the flow goes back to step S100. Thus, the processes at steps S100–S130 are repeated until the registered intersection Pn appears in the given range of distance from the current vehicle position.

On the other hand, if it is determined at step S130 that the next intersection Pn retrieved at step S120 is within the given range of distance from the current vehicle position, the flow goes to step S140. At step S140, the counter value i of registered intersection Pi indicating an intersection the vehicle is to pass is set at registered intersection numeral n of the next intersection Pn. The registered intersection numeral n is thus defined as the initial value to indicate the intersection corresponding to a starting point of navigation.

At the next step S150, when the vehicle approaches the registered intersection Pi corresponding to the counter value of n, three zones are determined to examine whether approach to the registered intersection Pi is to be announced. The three zones correspond to the aforementioned guidance zones, and the process at step S150 functions as the aforementioned zoning means M5. Further, from among the three guidance zones thus determined, a guidance zone is selected at step S220, which will be explained later in detail, as the actual zone to be used for providing guidance that the vehicle is approaching the next intersection Pi.

Figure 8:
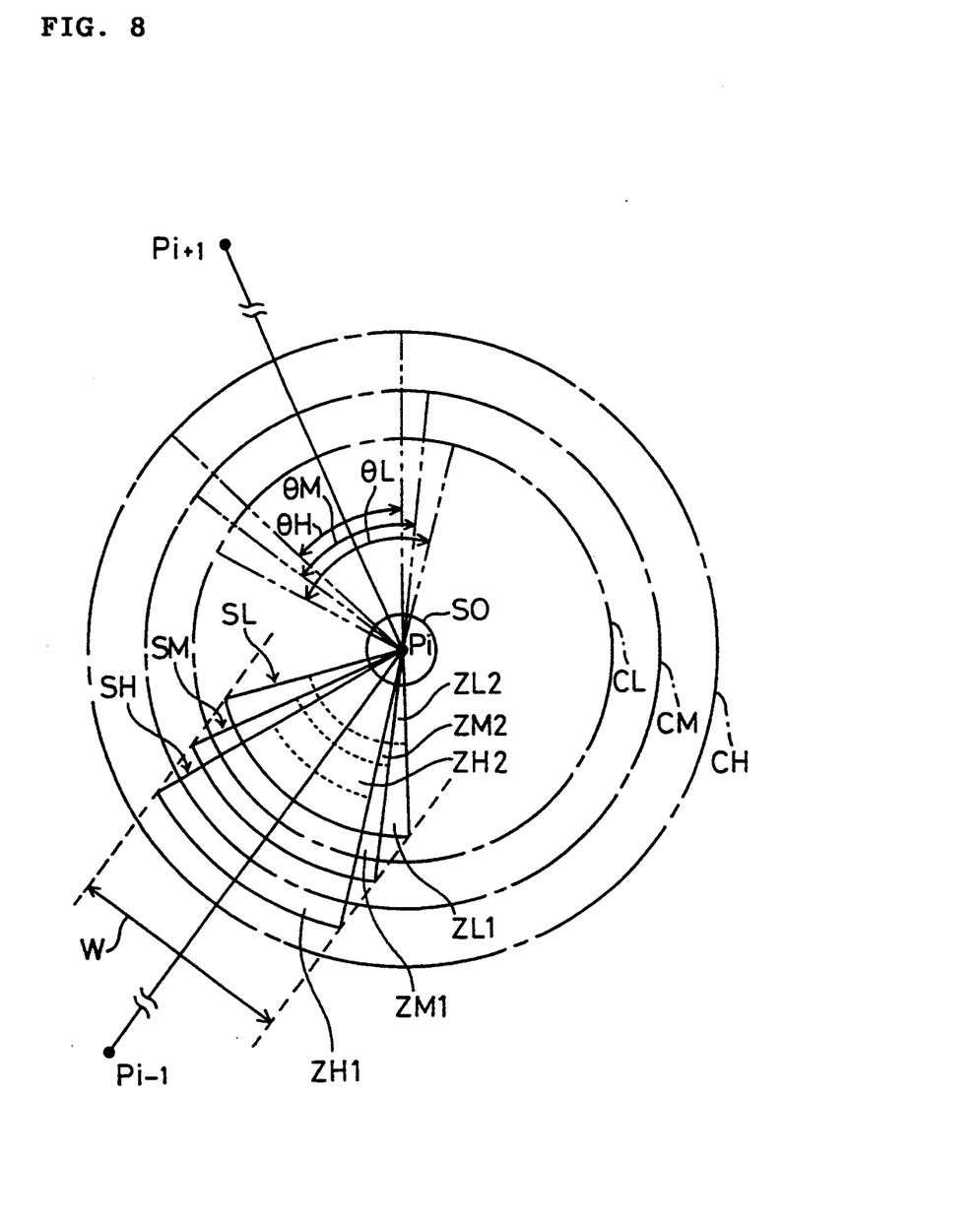
FIG. 8 is an illustration showing guidance zones and deviation determination circles determined for a registered intersection Pi.

The three guidance zones are pie-shaped sectors and are determined in the following manner. Three circles are first defined by respectively setting the radius of each circle to a predetermined approach determination distances. Sectors are then determined by defining arcs having a predetermined angle around the center of the circle such that the length of chords obtained from the arcs are equal. The sectors thus obtained are next placed on the road map with their centers coincident with the registered intersection Pi. An imaginary center line splitting the sectors into halves also coincides with the approach course that the vehicle takes in approaching the registered intersection Pi. Then, the area on the road map covered by the sectors are determined as the aforementioned guidance zones.

Specifically, the main controller 20 has pattern data for preparing the guidance zones. At step S150, according to the coordinates of the registered intersection Pi and the approach course the vehicle takes, the pattern data is coordinate-transformed and the three guidance zones are obtained.

More specifically, the main controller 20 has three pattern data of low velocity pattern data, medium velocity pattern date, and high velocity pattern data with respect to the vehicle velocity of 40 km/h (24.85 mph) or less, over 40 km/h (24.85 mph) to 90 km/h (55.9 mph), and over 90 km/h (55.9 mph). From these pattern data, the guidance zones, i.e. a low velocity guidance zone SL, a medium velocity guidance zone SM, and a high velocity guidance zone SH, shown exemplarily in FIG. 8, are prepared at step S150 for the registered intersection Pi.

The radius of the pie-shaped guidance zones, which is also referred to as the approach determination distance, is respectively determined to be substantially 160 m (524.8 Ft) for the low velocity guidance zone, 200 m (656 Ft) for the medium velocity guidance zone, and 250 m (820 Ft) for the high velocity guidance zone. The angle of the sector against the center of the corresponding circle is determined in association with the accuracy limit of 100 m (328 Ft) of the Global Positioning System, such that the length W of chords are all substantially 200 m (656 Ft).

Further, in the preferred embodiment, each of the guidance zones are divided into an outer zone and an inner zone by an arc crossing their respective approach determination distances in the middle. Specifically, the guidance zones SL, SM, and SH are respectively divided into outer first zones ZL1, ZM1, and ZH1, and inner second zones ZL2, ZM2, and ZH2, as shown in FIG. 8.

Also at step S150, a passage determination zone SO is provided for determining whether the vehicle has passed the registered intersection Pi. The passage determination zone SO is defined as a circle having a radius of substantially 30 m (98.4 Ft) with the next intersection Pi at its center, and includes a part of the second zones ZH2, ZM2, and ZL2 of the guidance zone SH, SM, and SL.

The approach course referred to in the present description is an imaginary straight line between the next registered intersection Pi and registered intersection $Pi_{-1}$ or an intermediating node closest to the registered intersection Pi.

Following the process at step S150, the flow goes step S160 to determine deviation determination circles, shown also in FIG. 8, for use in examining if the vehicle has traveled outside the circle without passing the registered intersection Pi, i.e. the vehicle is deviating from the route.

Similarly to the determination of guidance zones SL, SM and SH, three previously prepared pattern data are coordinate-transformed and a low velocity deviation determination circle CL, a medium velocity deviation determination circle CM, and a high velocity deviation determination circle CH are obtained with respect to vehicle velocity. The radii of these deviation determination circles CL, CM, and CH are a little larger than their respective corresponding guidance zones SL, SM, and SH.

At the next step S170, deviation determination bearings are determined for examining whether the vehicle has taken the appropriate course toward the next registered intersection $Pi_{+1}$ after traveling out of the deviation determination circles CL, CM, and CH determined at step S160.

The deviation determination bearings, shown exemplarily as ΘH, ΘM, and ΘL in FIG. 8, are defined in the following manner. An imaginary straight line between the registered intersection Pi and the next registered intersection $Pi_{+1}$ or an intermediating node, if any, closer to the registered intersection Pi is first assumed. The same angle ranges are next assumed around the registered intersection Pi as those of guidance zones SL, SM, and SH determined at step S150 such that the angles are divided into halves by the imaginary straight line. The angle ranges thus obtained are consequently determined as the deviation determination bearings.

Figure 5B:
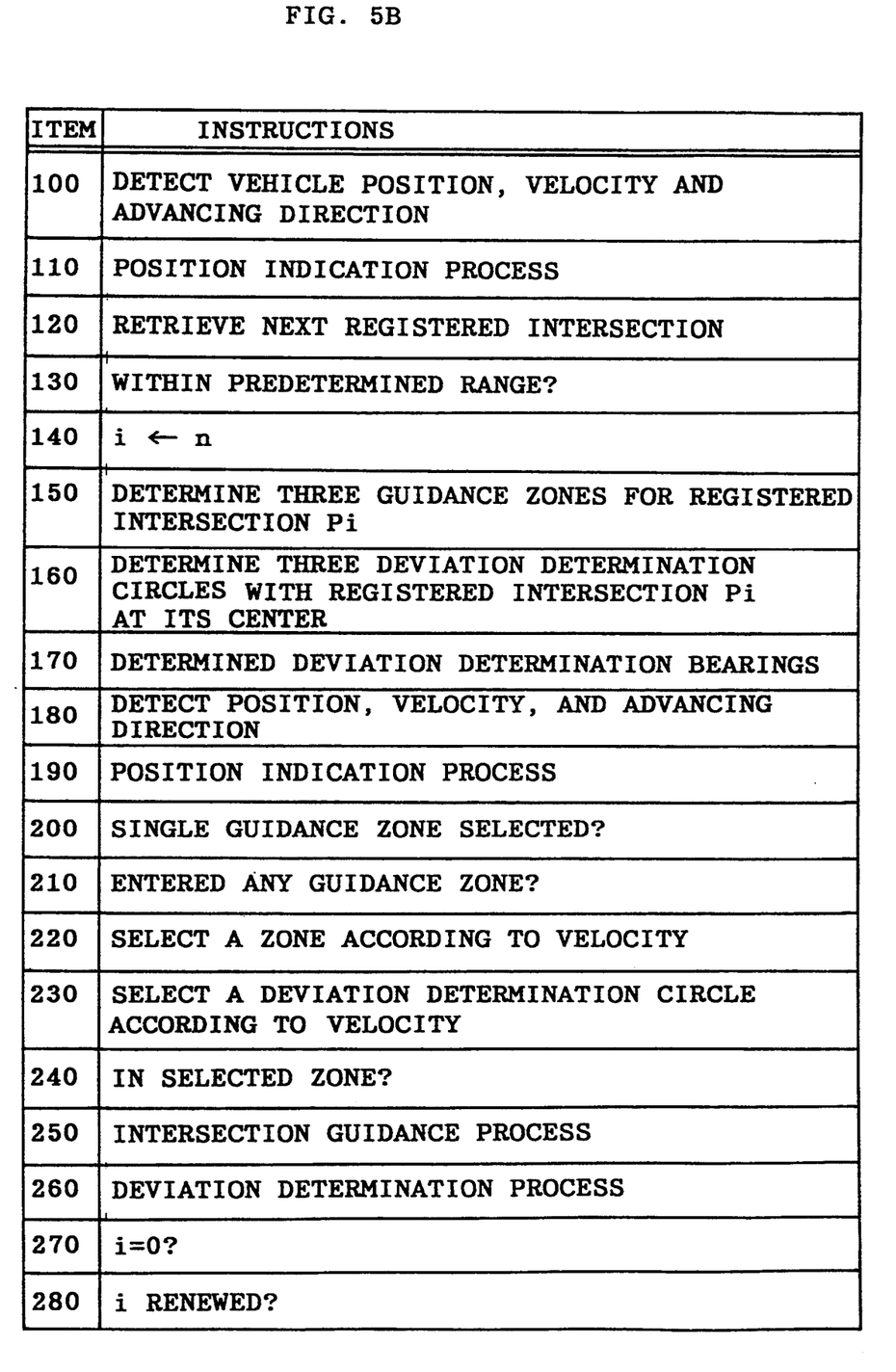

At the next step S180, similarly to the process at step S100, the most current velocity position and advancing direction of the vehicle are detected. According to the result, the position and advancing direction of the vehicle currently displayed on the display 14 are renewed, step S190 as position indication process step, similarly to the process at step S110.

At the next step S200, it is determined whether one of the guidance zones SL, SM, and SH has already been selected by the process at step S220 which will be later explained in detail. If "NO" is determined at this step S200, it is next determined, step S210, whether the vehicle has entered any of the guidance zones SL, SM, and SH based on the vehicle position most currently detected at step S180. The process at step S210 thus serves as position determination means M7. Thus, in the present embodiment, any one of the guidance zones SL, SM, and SH is relied upon by the position determination means M7.

If it is determined at step S210 that the vehicle has not entered any of the guidance zones SL, SM, and SH, the flow goes back to step S180. Thus, the process at steps S180 through S210 is repeated until it is determined at step S210 that the vehicle has entered any one of the guidance zones SL, SM, and SH.

When it is determined at step S210 that the vehicle has entered any of the guidance zones SL, SM, and SH, the process step proceeds to step S220 serving as a zone selection means M8 to select one of the guidance zones SL, SM, and SH according to the vehicle velocity most currently detected at step S180. Therefore, if the vehicle velocity detected is 40 km/h (24.85 mph) or less, the low velocity guidance zone SL is selected. Likewise, for vehicle velocity over 40 km/h (24.85 mph) to 90 km/h (55.9 mph), the medium velocity guidance zone SM is selected, and for vehicle velocity over 90 km/h (55.9 mph) the high velocity guidance zone SH is selected.

At step S230, one of the deviation determination circles CL, CM, and CH determined at step S160 is selected based on the vehicle velocity detected most currently at step S180. Therefore, if the medium velocity guidance zone SM has been selected at step S220, the corresponding medium velocity deviation determination circle CM is selected at step S230. The deviation determination circle thus selected will be hereinafter referred to simply as the selected determination circle.

After a guidance zone and a deviation determination circle are selected by the process at steps S220 and S230 or after it is determined at step S200 that a guidance zone has been selected, the flow proceeds to step S240.

At step S240, based on the vehicle position most currently detected at step S180 and the selected guidance zone, it is determined whether the vehicle has entered any of the selected guidance zones or the passage determination zone SO. If "YES" is determined at this step S240, the flow proceeds to step S250 serving as the route intersection guidance means M9.

The process at step S250 is a route intersection guidance process for informing the driver of the approaching intersection with a signal such as by flashing the registered intersection Pi and giving an audible message.

On the other hand, if it is determined at step S240 that the vehicle has entered neither the selected guidance zone nor the passage determination zone SO, the process step goes to step S260 to perform the deviation determination process to examine if the vehicle is deviating from the predetermined route.

Completion of the intersection guidance process at step S250 and the deviation determination process at step S260 leads to the process at step S270.

At step S270, it is determined if the counter value of i indicating a registered intersection the vehicle is to pass next is cleared as a result of a deviation determination at the deviation determination process step. If "YES" is determined at this step S270, the flow goes back to step S100 and the processes thereafter are effected again.

When "NO" is determined at step S270, the flow proceeds to step S280 to examine if the counter value of i is renewed. This renewal is responsive to the intersection guidance process determining that the vehicle has not deviated and has passed the registered intersection Pi, or responsive to the deviation determination process determining that the vehicle has exited the selected circle in the deviation determination bearings. If "YES"

is determined at step S280, the flow goes to step S150. If "NO" is determined at step S280, the flow goes to step S180.

Thus, when it is determined by the deviation determination process that the vehicle is deviating from the route, the process at step S100 and thereafter are effected again. On the other hand, if it is determined that the counter value of i is renewed, the process at step S150 and thereafter are effected such that further route guidance is performed targeting the next registered intersection $P_{i+1}$.

Figure 6A:
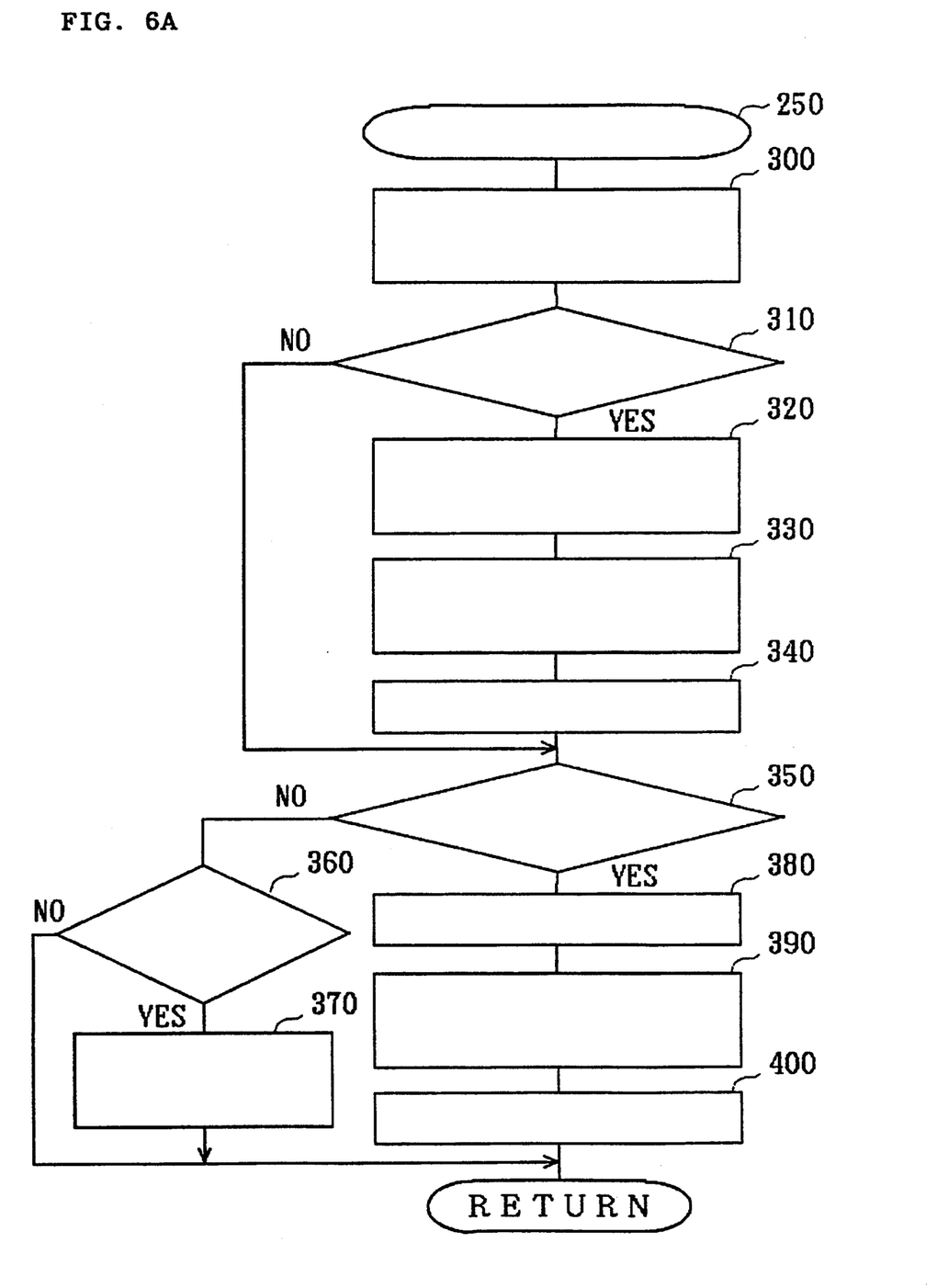
FIGS. 6A and 6B together are a flowchart showing the intersection guidance process effected at step S250 of the navigation process.
Figure 6B:
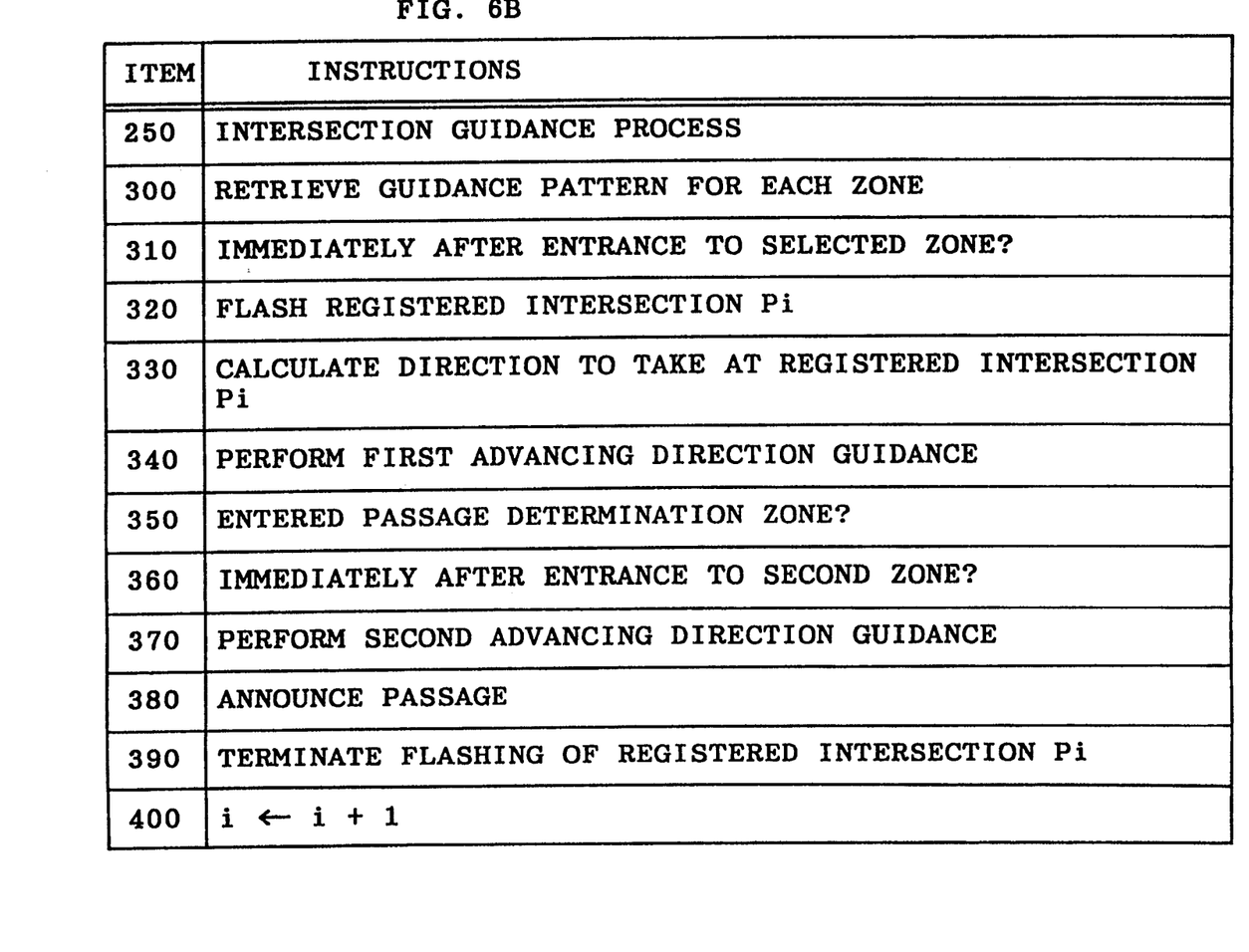

The intersection guidance process is effected at step S250, shown in FIG. 6, and will be explained hereinafter in detail.

First at step S300, the guidance pattern is retrieved from ROM 24 for each of the first and second zones of the selected guidance zone and passage determination zone SO. The guidance pattern includes audible messages for informing the driver that the vehicle has entered a corresponding zone.

At step S310, it is determined whether it is immediately after the entrance of the vehicle into the selected guidance zone, specifically the first zone of the selected guidance zone. If "YES" is determined, the flow goes to step S320 to start flashing the indication of the registered intersection Pi on the road map displayed on the display 14. Next, at step S330, the advancing direction, i.e. go straight, right turn or left turn, to be followed at the registered intersection Pi toward the next registered intersection $P_{i+1}$ is calculated.

The flashing indication of the registered intersection Pi is performed by alternately flashing yellow and blue indications.

The advancing direction from the registered intersection Pi to the next registered intersection $P_{i+1}$ is obtained in the following manner.

First, an exiting course of the vehicle in leaving the registered intersection Pi is defined as an imaginary straight line between the registered intersection Pi and the next registered intersection $P_{i+1}$ or an intermediating node. If the exiting course is tilted to the right at an angle of 60 degrees or more relative to the approach course obtained at step S150 in determining guidance zones, the advancing direction is determined to be a "right turn". Likewise, if the exiting course is tilted to the left at an angle of 60 degrees or more relative to the approach course, the advancing direction is determined to be a "left turn". If the exiting course is tilted to the right or to the left at an angle of 30 degrees or more but under 60 degrees, the advancing direction is determined to be a "right forward turn" or a "left forward turn". In other cases, the advancing direction is determined to be "go straight".

Subsequently, at step S340, a first advancing direction guidance is performed. Specifically, the advancing direction is reported to the driver by the alarm device 12 generating an electronic alarm sound plus a voice message, such as "Beep! Turn left at the next intersection."

If, on the other hand, it is determined at step S310 that it is not immediately after the entrance of the vehicle into the selected guidance zone, or when the process at steps S320 through S340 are completed, the flow goes to step S350 to examine whether the vehicle has entered the passage determination zone SO shown exemplarily in FIG. 8.

If "NO" is determined at step S350, it is next determined, step S360, whether the vehicle has just entered the second zone ZL2, ZM2, ZH2 of the selected guidance zone. If "YES" is determined at step S360, the flow goes to step S370 and a second advancing direction guidance is performed. Specifically, further approach of the vehicle to the registered intersection Pi is determined, and the driver is provided with electronic alarm sound and voice message such as "Beep! Turn left at the next intersection." via the alarm device 12. When this process step is finished or when it is determined at step S360 that it is not immediately after the entrance of the vehicle into the second zone of the selected guidance zone, the instant intersection guidance process ends.

On the other hand, if it is determined at step S350 that the vehicle has entered the passage determination zone SO, the flow goes to step S380. At step S380, the fact that the vehicle has passed the registered intersection Pi is reported to the driver through the alarm sound of "Beep!" via the alarm device 12. At next step S390, the flashing indication of the registered intersection Pi on the road map displayed on the display 14 is terminated.

At the following step S400, it is determined that guidance of the registered intersection Pi is no longer necessary and the counter value of i is incremented, thereby ending the instant intersection guidance process.

Thus, the present guidance process specifically performs two steps in guiding a driver: The first advancing direction guidance is performed when the vehicle approaches the registered intersection Pi and enters the first zone ZL1, ZM1, ZH1 of the selected guidance zone and the second advancing direction guidance is performed when the vehicle further approaches and enters the second zone ZL2, ZM2, ZH2 of the selected guidance zone. Consequently, when the vehicle enters the passage determination zone SO, the fact that the vehicle has passed the registered intersection Pi is announced to the driver and the flashing indication of the registered intersection Pi is terminated.

Figure 7A:
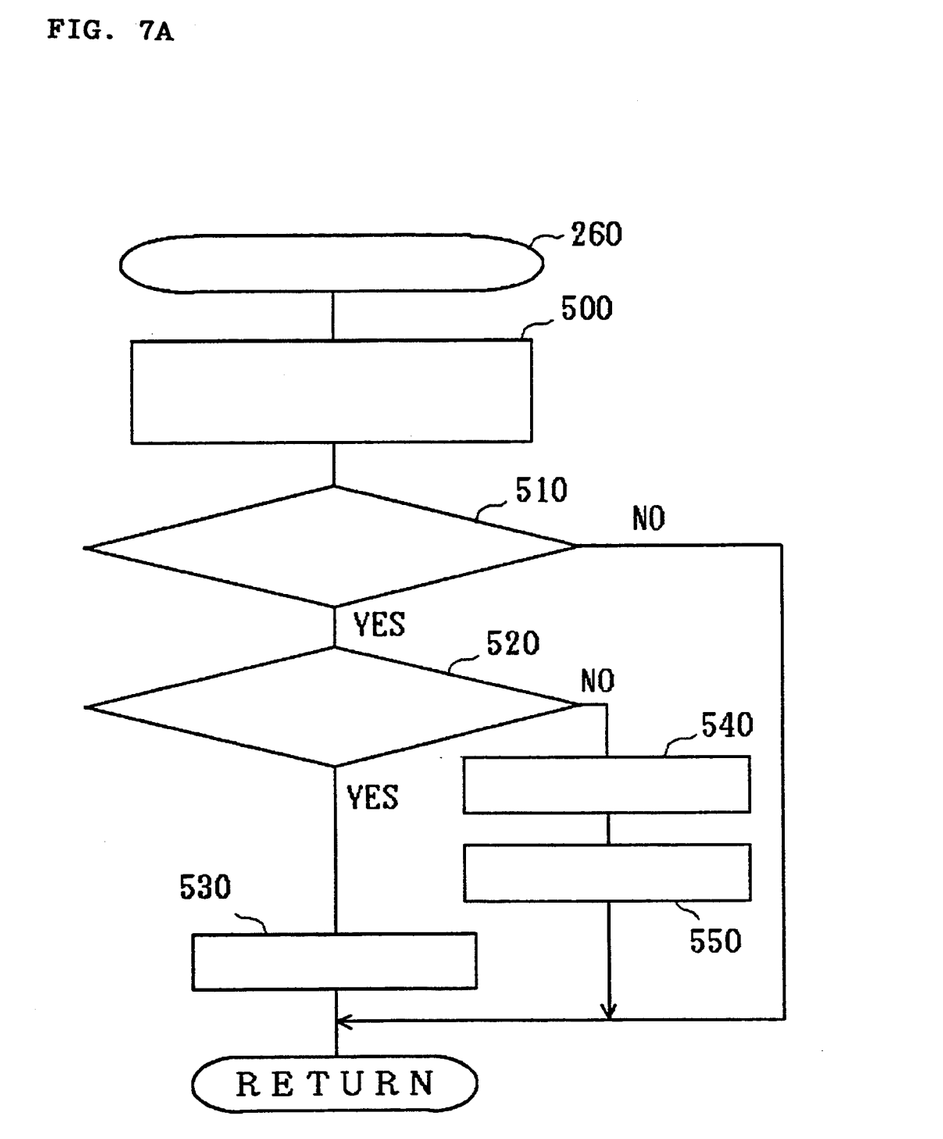
FIGS. 7A and 7B together are a flowchart showing the deviation determination process as effected at step S260 of the navigation process.
Figure 7B:
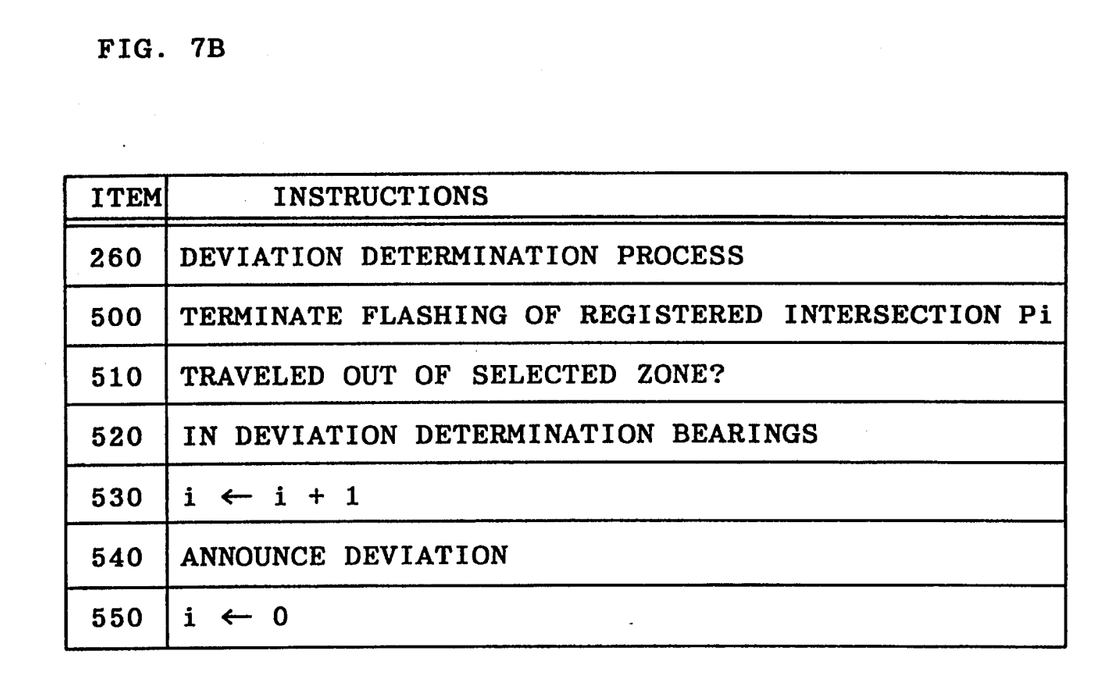

The deviation determination process shown in FIG. 7 and effected at step S260 will be explained hereinafter in detail.

First at step S500, the flashing indication of the registered intersection Pi is terminated. At the following step S510, it is determined whether the vehicle has traveled out of the deviation determination circle selected at step S160. If "NO" is determined at step S510, the instant deviation determination process ends.

If it is determined at step S510 that the vehicle has traveled out of the selected circle, it is next determined, step S520, whether the exiting course the vehicle has taken in moving out of the selected circle is the same as the deviation determination bearings determined at step S170. Thus, at the step S520, it is examined whether the vehicle has crossed the arc defined by the deviation determination bearings on the periphery of the selected circle.

If it is determined at step S520 that the vehicle has traveled out of the selected circle in the deviation determination bearings, it is determined at step S530 that the guidance of the registered intersection Pi is no longer necessary, the counter value of i is incremented, and the instant deviation determination process ends.

On the other hand, if it is determined at step S520 that the exiting course of the vehicle in traveling out of the selected circle differs from the deviation determination bearings, the flow goes to step S540. At step S540, the deviation of the vehicle from the route to be taken is reported to the driver by, for instance, generating a corresponding voice message such as a "Deviation occurred" three times and by flashing the registered intersection Pi indicated on the display 14 for a predetermined time period.

At the next step S550, the counter value of i is cleared. This is in preparation for retrieval of a new next registered intersection closest to the current position of vehicle, from which further navigation process steps starting at step S100 are to be performed. The present deviation determination process then ends.

Thus, in the deviation determination process, only when the vehicle travels out of the selected circle in the deviation determination bearings is the counter value of i incremented at step S530, such that navigation is performed targeting the next registered intersection $Pi_{+1}$. In contrast, when the vehicle travels out of the selected circle in a direction other than the deviation determination bearings, it is determined that the vehicle is deviating from the route, the counter value of i is cleared at step S550, and the processes at step S100 and thereafter are repeated.

The navigation system described in the instant embodiment determines three zones for determining whether guidance is to be provided when a vehicle has approached a registered intersection Pi. The three zones are provided with respect to vehicle velocity and are classified into three categories, i.e. low velocity, medium velocity, and high velocity. The three zones form pie-shaped sectors, having radii of different lengths, and lying along the advancing course of the vehicle. One of the three zones is selected according to the current velocity of the vehicle. When the vehicle enters the selected zone, it is determined that the vehicle is approaching a registered intersection Pi. Consequently, the direction to be taken at the registered intersection Pi is announced by an audible message and the registered intersection Pi indicated on the displayed road map is flashed until the vehicle further advances and enters the passage determination zone SO or travels out of the selected zone.

In prior art navigation systems, the approach of the vehicle to a route intersection is detected when the distance between the current vehicle position and the route intersection becomes a given value or less. In contrast, even when the GPS receiver 2 is under unfavorable conditions, and there is an error in detected vehicle position, the present navigation system is substantially relieved of erroneous determination of an approaching registered intersection Pi, and informs the driver of a correct direction to take at the intersection Pi.

Moreover, the present navigation system provides a driver with a longer time period in which to prepare for an approaching route intersection when the vehicle velocity is higher. Accordingly, the driver can safely change lanes, if required, regardless of the vehicle velocity. Safe driving is thus also assured.

Specifically, if only one kind of zone for providing guidance is prepared regardless of vehicle velocity, a vehicle running at a higher velocity has a relatively shorter time from the announcement of a registered intersection Pi to the arrival at the registered intersection Pi. As a result, in many cases the driver has to swiftly slow down the vehicle and change lanes right in front of the registered intersection Pi. The present navigation system is free from this problem.

Further, in the present navigation system, the guidance zone is divided into a first zone and a second zone. As the vehicle enters each zone, approach of the vehicle to the registered intersection Pi is announced to the driver. The driver can thus be stepwisely informed of the approach to the registered intersection Pi.

Further, since the chords of the guidance zones are equal in length, the width range of respective first zones are similarly equal. Therefore, determination of the entrance of the vehicle into a selected zone is equally effected irrespective of vehicle velocity. The length of the chord is determined to be substantially 200 m (656 Ft) so as to accommodate the detection accuracy limit of the Global Positioning System, that is deemed to be substantially 100 m (328 Ft) in the present embodiment. Therefore, as long as the vehicle is moving on a predetermined route, entrance of the vehicle into a selected zone can be determined without being affected by the detection error due to the GPS's accuracy limit, and the driver is informed of a registered intersection Pi that the vehicle is approaching.

In addition to the deviation determination circles with registered intersection Pi at their center, the navigation system of the present embodiment determines deviation determination bearings for use in determining deviation of the vehicle. The deviation determination bearings lie in the same angle range as the guidance zone and extend in the direction of a straight line between the registered intersection Pi and the next registered intersection $Pi_{+1}$. When the vehicle exits the deviation determination circle in a direction other than the deviation determination bearings, it is determined that the vehicle is deviating from the route. The driver, informed of the deviation by an audible message, can change lanes appropriately and is guided along a correct route. Deviation from the route is thus prevented.

Thus, the present navigation system determines a plurality of zones for determining whether guidance is to be provided. The zones are shaped in pie-shaped sectors of circles having radii of varying lengths, and lie along an approach course the vehicle takes in approaching a next intersection. One of the plurality of zones is selected according to the current vehicle velocity such that the higher the vehicle velocity is, the larger the radius of the selected zone. The approach of the vehicle is announced to the driver only when the vehicle is within the selected zone.

In prior art navigation systems, approach of the vehicle to a route intersection is detected when the distance between the current vehicle position and the route intersection decreases and becomes a predetermined value or less. Compared to these prior art navigation systems, the present navigation system is endowed with higher reliability in its determination of an approach to a route intersection. This is by virtue of the pie-shaped sector zones for determining an approach that lie along the course the vehicle takes in approaching the intersection. The present navigation proves superior results especially in prevention of misleading guidance caused when the detected vehicle position differs from the actual position of the vehicle.

Further, since the zone for providing guidance changes in its radius, the time period for providing a guidance changes in proportion with the driving conditions, i.e. the vehicle velocity, and is prevented from becoming relatively too long or too short for the vehicle velocity making the driver feel uneasy.

Further, since the chords of the guidance zones are equal in length, the width range of each first zones are similarly equal. Therefore, no matter which zone is selected, determination of entrance of the vehicle into a selected zone is equally effected irrespective of the vehicle velocity and the driver is informed of an approach to the next intersection.

Wherefore, having described the present invention, what is claimed is:

1. A navigation system for a vehicle including display means for displaying a road map, map data storage means for storing map data to provide the road map and a predetermined route to be taken on the road map, position detecting means for detecting a current position of the vehicle, and display control means for controlling said display means to display the road map according to the map data and for recognizably indicating the predetermined route to be taken and the current position of vehicle on the displayed road map, wherein said navigation system further includes:

zoning means for determining, according to the predetermined route and the current position of the vehicle, a next intersection on the route to be taken, and for determining, according to a course of the vehicle as the vehicle approaches the next intersection, a plurality of sector-shaped guidance zones defined by sectors of circles having the next intersection at their center and having different approach determination distances to the next intersection as their radii, each said guidance zone having a chord of equal length and the approach course of the vehicle dividing each guidance zone in half, velocity detecting means for detecting the velocity of the vehicle, position determination means for determining, according to the detected vehicle position, whether the vehicle enters a range of a predetermined distance from the next intersection, zone selection means for selecting, when it is determined by said position determination means that the vehicle entered the range of a predetermined distance from the next intersection, one of the plurality of guidance zones according to the current vehicle velocity detected by said velocity detecting means, and said guidance zone being selected such that the greater the vehicle velocity, the larger the approach determination distance of said selected guidance zone, and route intersection guidance means for determining whether the currently detected vehicle position is within said selected guidance zone, and, when it is determined that the vehicle position is within the selected guidance zone, for announcing that the vehicle is approaching the next intersection.

2. A navigation system according to claim 1, wherein each of the guidance zones is divided into an inner zone and an outer zone by an arc located midway along the radius of each guidance zone.

3. A navigation system according to claim 1, wherein the zoning means generates three guidance zones, one having a long approach determination distance for a high vehicle velocity, one having a medium approach determination distance for a medium vehicle velocity, and one having a short approach determination distance for a slow vehicle velocity.

4. A navigation system according to claim 3, wherein the high vehicle velocity, the medium vehicle velocity, and the slow vehicle velocity guidance zones have approach determination distances of substantially 250 meters, 200 meters, and 160 meters, respectively.

5. A navigation system according to claim 1, further comprising passage determination means for determining a passage determination zone, defined by a circle having its center at the next intersection and a radius that is a portion of the approach determination distance, and for determining whether the currently detected vehicle position is within the passage determination zone and, when it is determined that the vehicle position is within the passage determination zone, for announcing that the vehicle has passed the next intersection.

6. A navigation system according to claim 1, further comprising deviation determination means for determining a plurality of deviation determination circles having their centers at the next intersection and having radii of incrementally decreasing lengths, deviation determination bearings defined by a plurality of chords that lie on the deviation determination circles and are centered on an imaginary line from the next intersection on the predetermined route to be taken and an intersection consecutively following the next intersection on the predetermined route to be taken, selecting, when it is determined that the vehicle has entered the range of a predetermined distance from the next intersection, a deviation determination circle according to the currently detected vehicle velocity, said selected deviation determination circle being selected such that the greater the velocity of the vehicle the larger the radius of the deviation determination circle, and said deviation determination means announcing, when it is determined that the vehicle is outside the deviation determination circle and that the vehicle did not cross one of the deviation determination bearings when exiting, that the vehicle is deviating from the predetermined route to be taken.

7. A navigation system according to claim 1, wherein said position detecting means further comprises a receiver, having an antenna connected therewith, for receiving a transmission signal from a satellite for determining the current position of the vehicle.

8. A navigation system according to claim 1, wherein said display means is one of a cathode ray tube and a liquid crystal screen.

9. A navigation system according to claim 1, wherein said navigation system further comprises a main controller communicating with said display control means for displaying information processed by said main controller.

10. A navigation system according to claim 9, wherein said main controller communicates with an alarm control device which, in turn, communicates with an alarm device and said alarm device is actuated, during use of said navigation system, for at least one of issuing warnings and announcing instructions.

11. A method of navigating a motor vehicle comprising the step of:

displaying a road map and a predetermined route to be taken on a display device, detecting the current position of the vehicle, determining, according to the predetermined route and the currently detected position of the vehicle, a next intersection on the route to be taken, determining, according to an approach course of the vehicle as the vehicle approaches the next intersection, a plurality of guidance zones defined by sectors of circles having the next intersection at their center and having different approach determination distances as their radii, and the approach course of the vehicle dividing each guidance zone in half, detecting the velocity of the vehicle, determining, according to the current vehicle position, whether the vehicle entered a range of a predetermined distance from the next intersection, selecting, when it is determined that the vehicle entered the range of the predetermined distance from the next intersection, one of the plurality of guidance zones according to the vehicle velocity, with said guidance zone being selected so that the greater the vehicle velocity the larger the approach determination distance of said selected guidance zone, and determining, with route intersection guidance means, whether the currently detected vehicle position is within said selected guidance zone, and, when it is determined that the vehicle position is within the selected guidance zone, announcing that the vehicle is approaching the next intersection.

12. A method according to claim 11 further comprising the step of forming each guidance zone into an inner zone and an outer zone via an arc centered midway along the radius of each guidance zone.

13. A method according to claim 11 further comprising the steps of using three guidance zone, one having a long approach determination distance, one having a medium approach determination distance, and one having a short approach determination distance.

14. A method according to claim 11 further comprising the steps of determining a passage determination zone defined by a circle having the next intersection at its center and a radius that is a portion of the approach determination distance, and determining, with passage determination means, whether the currently detected vehicle position is within the passage determination zone, and, when it is determined that the vehicle position is within the passage determination zone, announcing that the vehicle has passed the next intersection.

15. A method according to claim 11 further comprising the steps of determining a plurality of deviation determination circles having their centers at the next intersection and having radii of incrementally decreasing length, determining deviation determination bearings defined by a plurality of chords that lie within the range of a predetermined distance from the next intersection, selecting a deviation determination circle according to the vehicle's currently detected velocity, said deviation determination circle being selected such that the higher the vehicle velocity the larger the deviation determination circle radius, and, when it is determined that the vehicle is outside the deviation determination circle and that the vehicle did not cross one of the deviation determination bearings when exiting, said deviation determination means announcing that the vehicle is deviating from the predetermined route to be taken.

* * * * *